US008874635B2

(12) United States Patent
Mustafa (10) Patent No.: US 8,874,635 B2
(45) Date of Patent: Oct. 28, 2014

(54) INTERNET MULTIMEDIA CONTENT DELIVERY TO CONSUMER ELECTRONIC DEVICES THROUGH WIRELESS NETWORK INFRASTRUCTURE

(76) Inventor: Shakeel Mustafa, Fremont, CA (US)

(*) Notice: Subject to any disclaimer, the term of this patent is extended or adjusted under 35 U.S.C. 154(b) by 139 days.

(21) Appl. No.: 12/174,083

(22) Filed: Jul. 16, 2008

(65) Prior Publication Data

US 2009/0112971 A1  Apr. 30, 2009

Related U.S. Application Data

(60) Provisional application No. 61/000,859, filed on Oct. 30, 2007.

(51) Int. Cl.
*G06F 15/16* (2006.01)
*H04L 29/06* (2006.01)
*H04L 29/08* (2006.01)
*H04L 12/28* (2006.01)

(52) U.S. Cl.
CPC ............ *H04L 65/605* (2013.01); *H04L 65/103* (2013.01); *H04L 12/2836* (2013.01); *H04L 67/2823* (2013.01); *H04L 67/28* (2013.01); *H04L 67/303* (2013.01)
USPC .......... 709/202; 455/450; 455/455; 455/3.06; 455/522; 463/41; 463/42; 725/87; 725/131; 370/230; 370/338

(58) Field of Classification Search
CPC ... H04L 67/605; H04L 67/28; H04L 67/2823; H04L 67/303; H04L 65/103; H04N 21/44222; H04N 21/2886
USPC ......... 709/202; 455/450, 455, 456, 522, 3.06; 463/41–42; 725/87, 131; 370/230, 338
See application file for complete search history.

(56) References Cited

U.S. PATENT DOCUMENTS

| 5,864,305 | A | 1/1999 | Rosenquist |
| 6,466,585 | B1 | 10/2002 | Le |
| 7,599,788 | B1 * | 10/2009 | Banerjee et al. ............. 701/117 |
| 2001/0021653 | A1 * | 9/2001 | Han .............................. 455/450 |
| 2003/0030720 | A1 * | 2/2003 | Hutchings ................. 348/14.02 |
| 2004/0249924 | A1 * | 12/2004 | Watanabe et al. ............. 709/223 |
| 2006/0126716 | A1 | 6/2006 | Williams et al. |
| 2006/0127037 | A1 * | 6/2006 | Van Hoff et al. ................ 386/83 |
| 2006/0286929 | A1 * | 12/2006 | Schlafly et al. ............. 455/3.06 |
| 2007/0011225 | A1 | 1/2007 | Hsu et al. |
| 2007/0011604 | A1 * | 1/2007 | Chiu ............................ 715/513 |
| 2007/0022443 | A1 * | 1/2007 | Santhoff ......................... 725/63 |
| 2007/0083895 | A1 * | 4/2007 | McCarthy et al. ............. 725/46 |
| 2007/0088852 | A1 * | 4/2007 | Levkovitz ..................... 709/246 |
| 2007/0099704 | A1 * | 5/2007 | Liu et al. .......................... 463/42 |
| 2007/0147280 | A1 * | 6/2007 | Ashmore et al. ............. 370/320 |
| 2007/0188902 | A1 * | 8/2007 | Patron et al. .................. 709/223 |
| 2008/0160967 | A1 * | 7/2008 | Narasimhan et al. ....... 455/414.1 |
| 2008/0186929 | A1 * | 8/2008 | Rice et al. ...................... 370/338 |

FOREIGN PATENT DOCUMENTS

| JP | 2003198570 A | 7/2003 |
| KR | 20070047593 A | 5/2007 |

* cited by examiner

*Primary Examiner* — Hitesh Patel (57) ABSTRACT

Internet multimedia content delivery methods, devices and systems are disclosed. In one embodiment, a method for communicating internet multimedia data to a consumer electronic via a wireless network comprises receiving the internet multimedia data via the wireless network, converting the internet multimedia data to a data type associated with the consumer electronic device, and forwarding the internet multimedia data of the data type to the consumer electronic device, where the internet multimedia data via the wireless network is serviced by an internet multimedia data server.

30 Claims, 10 Drawing Sheets

INTERNET MULTIMEDIA CONTENT DELIVERY TO CONSUMER ELECTRONIC DEVICES THROUGH WIRELESS NETWORK INFRASTRUCTURE

RELATED APPLICATIONS

Benefit is claimed under 35 U.S.C §119(e) of U.S. provisional application Ser. No. 61/000,859 entitled "system and method of delivering information to conventional radio signal devices through using cellular and satellite network infrastructure" filed on Oct. 30, 2007, and the provisional application is herein incorporated in its entirety by reference for all purposes.

FIELD OF TECHNOLOGY

This disclosure relates generally to communication systems, methods, and devices for delivering internet multimedia information to and/or from consumer electronics devices.

BACKGROUND

Multimedia is media that utilizes a combination of different content forms. In general, multimedia includes a combination of text, audio, still images, animation, video, and/or interactivity content forms. Multimedia is usually recorded, played, displayed, and/or accessed by information content processing devices.

Internet multimedia data is a resource that can be accessed via the internet. A user can access particular internet multimedia data by requesting the data from a server. For example, the user may play a song or movie by logging onto a music or movie servicing website and filling out the request. The song or movie may be played using the very computer used for the request, but the quality of the song or movie may not be equivalent to the experience of playing it in a consumer electronic device designed for the very purpose, such as an audio player with high quality stereo system for playing the song or a DVD player coupled to a 50 inch high definition television for playing the movie.

However, in order to enjoy rich experience with the high end consumer electronic devices, the user may have to convert the downloaded song or movie to a format playable in the consumer electronic devices. This may consume extra time and/or extra expense from the user since the user may have to take steps in converting the multimedia data to a format playable in the electronic device from the internet format and/or in obtaining a license to play in the additional media. Furthermore, the option may not be available for the user when the user is on the road (e.g., driving an automobile) where the access to the internet is often not available.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

An embodiment described in the detailed description is directed to a method for communicating internet multimedia data to a consumer electronic device via a wireless network which comprises receiving the internet multimedia data via the wireless network, converting the internet multimedia data to a data type associated with the consumer electronic device, and forwarding the internet multimedia data of the data type to the consumer electronic device, where the internet multimedia data via the wireless network is serviced by an internet multimedia data server.

Another embodiment described in the detailed description is directed to a device for communicating internet multimedia to a radio receiving system via a cellular network. The device includes a transceiver module, a processor, and a memory comprising a set of instructions, when executed by the processor and the transceiver module, executes a method comprising receiving the internet multimedia data via the cellular network, converting the internet multimedia data to a data type associated with the radio receiving system, and forwarding the internet multimedia data of the data type to the radio receiving system, where the internet multimedia data via the cellular network is serviced by an internet multimedia data server.

Yet another embodiment described in the detailed description is directed to a method for interfacing multiple networks which comprises receiving request data from an input device via a first communication network, converting the request data from a protocol of the first communication network to an internet protocol suite, and forwarding the request data of the internet protocol suite to an internet multimedia data server. The method further comprises receiving reply data of the internet protocol suite from the internet multimedia data server in response to the request data, converting the reply data of the internet protocol suite to a protocol of a second communication network, and forwarding the reply data of the protocol of the second communication network, where the reply data of the protocol of the second communication network is further converted and forwarded for processing in a consumer electronic device.

As will be illustrated in the detailed description, other embodiments pertain to methods, systems, and devices that seamlessly deliver internet multimedia data to and/or from a consumer electronic device. By converting the internet multimedia data to a format suitable for a wireless communication network and then to a format playable in the consumer electronic device, the user can enjoy rich experience of playing the internet multimedia data using a high end consumer electronic device, such as a high end audio or video player system, than playing it using a computer directly connected to the internet. In addition, the delivery system can be used to seamlessly request and receive internet multimedia data from a server associated with a specific application. Furthermore, the embodiments may allow the user to enjoy the internet multimedia data in places where the internet is not available.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Briefly stated, embodiments pertain to methods, systems, and devices that seamlessly deliver internet multimedia data to and/or from a consumer electronic device. By converting the internet multimedia data to a format suitable for a wireless communication network and then to a format playable in the consumer electronic device, the user can enjoy rich experience of playing the internet multimedia data using a high end consumer electronic device, such as a high end audio or video player system, than playing it using a computer directly connected to the internet. In addition, the delivery system can be used to seamlessly request and receive internet multimedia data from a server associated with a specific application. Furthermore, the embodiments may allow the user to enjoy the internet multimedia data in places where the internet is not available.

Figure 1:
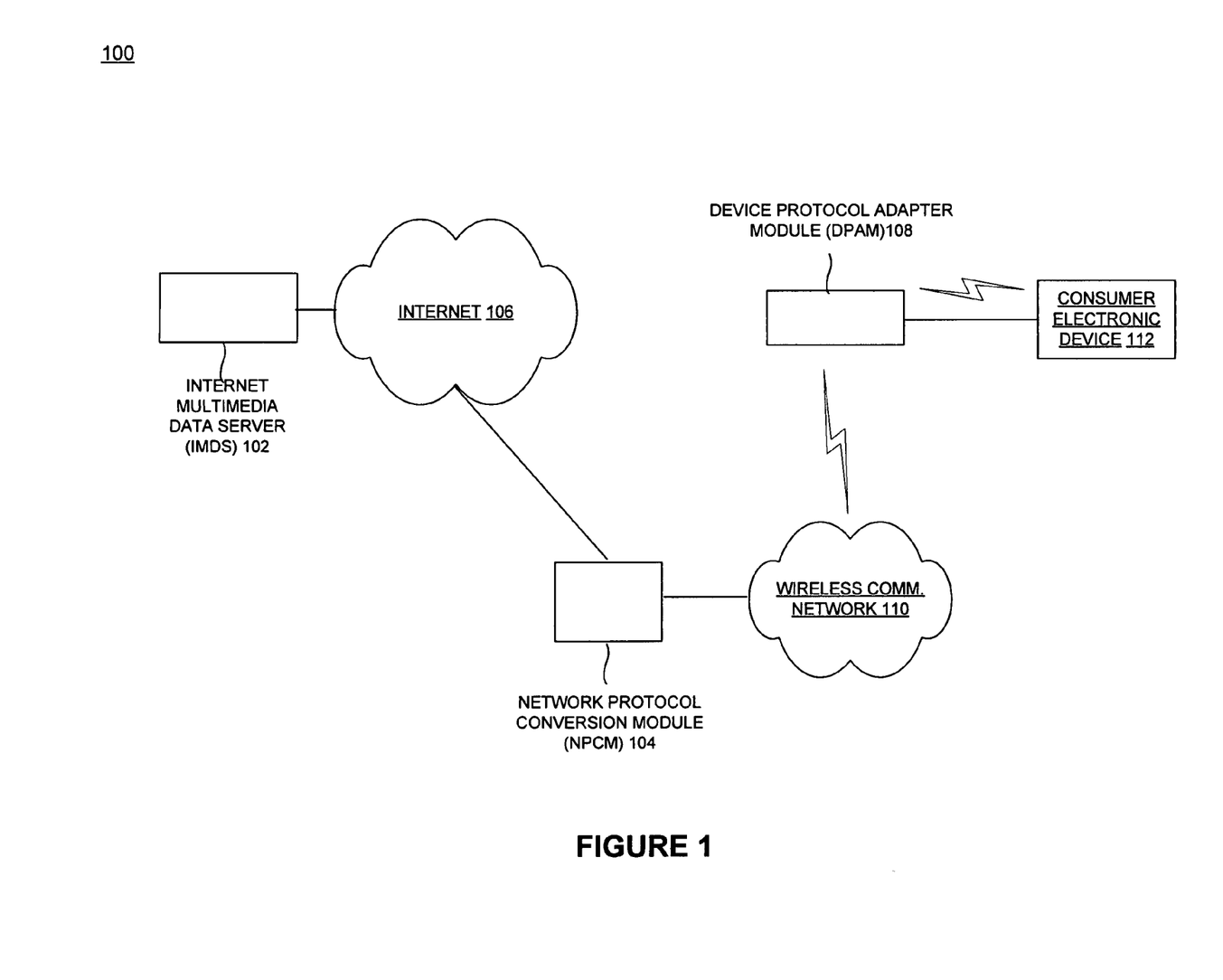
FIG. 1 is a block diagram of an exemplary communication system for delivering internet multimedia data to a consumer electronic device, according to one embodiment.

FIG. 1 is a block diagram of an exemplary communication system 100 for delivering internet multimedia data to a consumer electronic device 112, according to one embodiment. In FIG. 1, a device protocol adapter module (DPAM) 108 is used to communicate the internet multimedia data serviced by an internet multimedia data server (IMDS) 102 to the consumer electronic device 112 via a wireless network 110. The DPAM 108 may be implemented in the network system 100 in hardware and/or software. It is appreciated that the consumer electronic can be an audio player, such as an AM/FM radio and an IPOD, or a video player, such as a DVD player and a VCR. The DPAM 108 receives the internet multimedia data via the wireless network 110, and converts the internet multimedia data to a data type associated with the consumer electronic device 112. The DPAM 108 also forwards the internet multimedia data of the data type to the consumer electronic device 112.

In FIG. 1, the internet multimedia data serviced by the IMDS 102 is of an internet protocol suite (e.g., UDP/IP, TCP/IP, etc.). The internet multimedia data of the internet protocol suite is converted to the internet multimedia data of a wireless network 110 (e.g., a cellular network, a satellite network, a local area network, etc.) using a network protocol conversion module (NPCM) 104. Accordingly, the internet multimedia data received by the DPAM 108 may be in a data format of the wireless network 110.

In one exemplary implementation of the network system 100, although it is not shown in FIG. 1, a user may subscribe particular multimedia data or content serviced by the IMDS 102 by requesting it using an input device. Once the internet multimedia content is accessed and delivered to the DPAM 108 via the internet 106 and the wireless communication network 110 using the NPCM 104, it can be stored in a storage device coupled to the DPAM 108, converted to a format playable in the consumer electronic device 112, and/or played by the consumer electronic device 112.

It is appreciated that the IMDS 102, the NPCM 104 and/or the DPAM 108 can also have the capability to identify a data source, and then through a speech synthesis method, convert the data source to a different multimedia information format. For example, a user can request an issue of Time Magazine read to him while he is driving. A speech synthesis system in the IMDS 102, the NPCM 104 and/or the DPAM 108 may convert the text of the magazine into an audio format and/or deliver the information to the user via the car radio.

Figure 2:
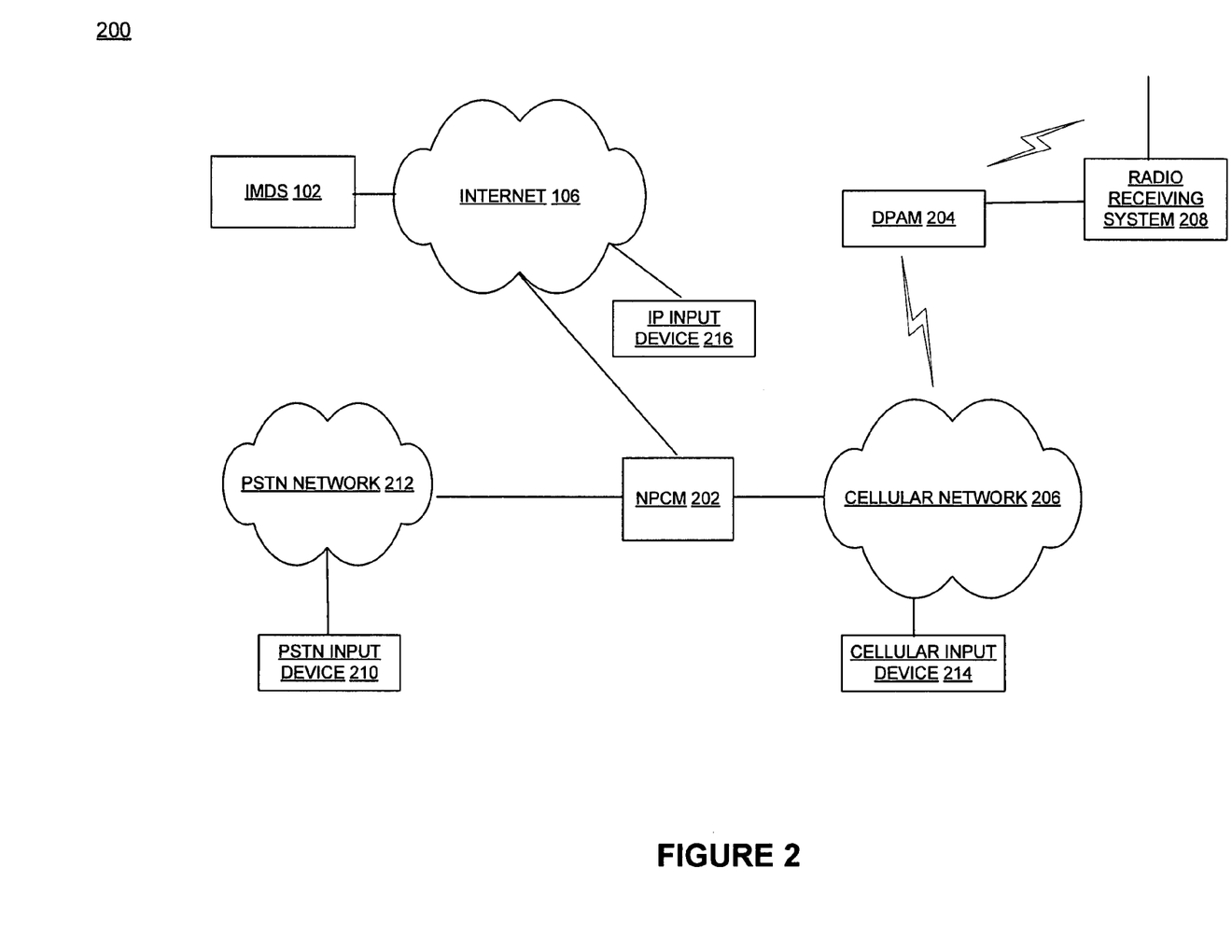
FIG. 2 is a block diagram of an exemplary communication system for delivering internet multimedia data to a radio receiving system, according to one embodiment.

FIG. 2 is a block diagram of an exemplary communication system 200 for delivering internet multimedia data to a radio receiving system 208, according to one embodiment. In FIG. 2, a DPAM 204 is used to communicate the internet multimedia data serviced by the IMDS 102 to the radio receiving system 208 via a cellular network 206. The DPAM 204 may be implemented in the network system 200 in hardware and/or software. The DPAM 204 receives the internet multimedia data via the cellular network 206, and converts the internet multimedia data to a data type associated with the radio receiving system 208 (e.g., AM/FM radio). In addition, the DPAM 204 forwards the internet multimedia data of the data type to the radio receiving system 208.

In FIG. 2, the internet multimedia data serviced by the IMDS 102 is of the internet protocol suite (e.g., the TCP/IP). The internet multimedia data of the internet protocol suite is converted to the internet multimedia data of the cellular network 206 using an NPCM 202. Accordingly, the internet multimedia data received by the DPAM 204 may be in a data format of the cellular network 206.

In addition, the internet multimedia data may be processed (e.g., played) by the radio receiving system 208 in response to a request for the internet multimedia data using an input device. The input device can be a public switch telephone network (PSTN) input device 212 (e.g., a telephone), a cellular input device 214 (e.g., a cell phone), or an internet protocol (IP) input device 216 (e.g., a laptop, a desktop, etc.).

The internet multimedia data may be identified through one or more unique identifiers that can uniquely identify the data stored in a storage device coupled to the IMDS 102. In addition, the NPCM 202 can have multiple types of interfaces operating through different types of communication protocols. For example, the NPCM 202 can include a tone driven system which can process a phone call and its audio data entered by the PSTN input device 210. The NPCM 202 converts the input data, which may contain a request for the internet multimedia data and its destination, to a format decipherable by the IMDS 102. Moreover, the NPCM 202 can extract audio data delivered by the IMDS 102 using the internet protocol suite, extract the audio data embedded in the incoming packets, and embed the audio data within another set of protocols, which are suitable for the cellular network 206.

The NPCM 202 can also retain a list of users along with cell identifiers (e.g., cell numbers) of respective DPAMs 204, where the internet multimedia data needs to be delivered. Moreover, a universal cell identifier can be assigned to a group of DPAMs 204, and it can be used to broadcast the internet multimedia data to the group of DPAMs 204. In this case, a communication tower or a base station may be used to broadcast packets of the internet multimedia data to the group of DPAMs 204 using a single channel. Accordingly, only those DPAMs with their identifiers matching the universal cell identifier may receive the data packets. In addition, proprietary and/or standard encryption techniques (e.g., DES, 3DES, AES, etc.) may be used, with or without the conjunction of IP security, to broadcast the data packets.

In one exemplary implementation, a user equipped with the NPCM 202 may be able to request multimedia content serviced by the IMDS 102, and play it using an AM/FM radio. This may allow the user, who may reside in a remote part of the globe which does not have a ready access to a certain regional radio station and/or to the internet, to subscribe to the radio station as long as the radio station provides its service through the internet and the user has access to a cellular network. In addition, the user may be able to request and download a music piece, and seamlessly play it using the user's high end audio player.

Figure 3:
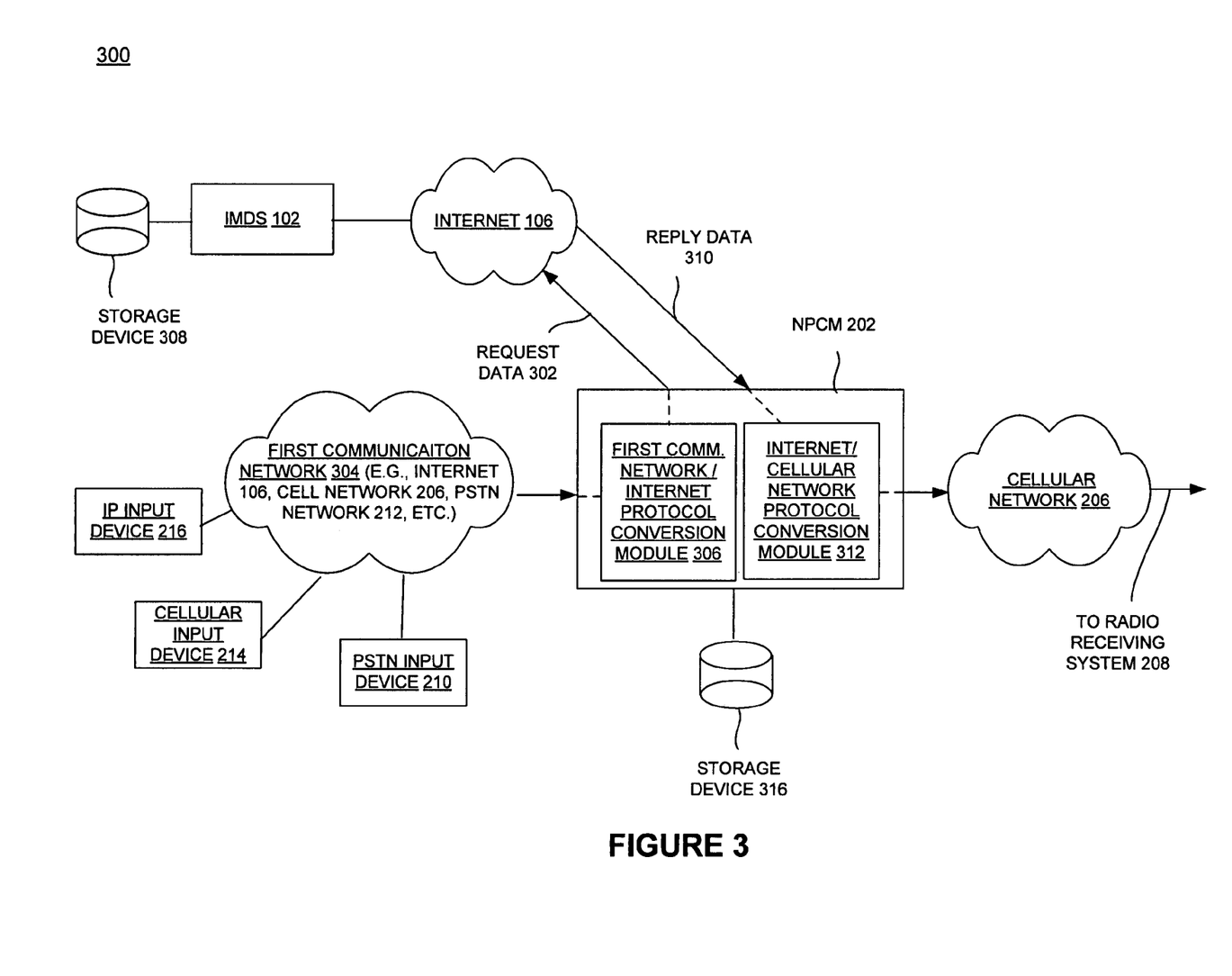
FIG. 3 is a block diagram illustrating exemplary functions of the NPCM of FIG. 2, according to one embodiment.

FIG. 3 is a block diagram illustrating exemplary functions of the NPCM 202 of FIG. 2, according to one embodiment. In FIG. 3, request data 302 may be generated and/or forwarded by an input device through a first communication network 304. The input device may be the PSTN input device 210 accessing the PSTN network 212, the cellular input device 214 accessing the cellular network 206, or the IP input device 216 accessing the internet 106.

In one exemplary implementation, a user can use his voice enabled device (e.g., cell phone) to request certain information though audio means. The NPCM 202 may be able to identify multimedia information requested by the user using a speech recognition system. The request is then converted and/or forwarded to the IMDS 102 in a proper format. Similarly, the user can use other types of input, such as punching in or dialing numbers on the phone pad in response to a prerecorded voice menu to make a particular selection. In response, the NPCM 202 may convert the input in a proper communication format and/or forward it to the IMDS 102. It is appreciated that the IMDS 102 and the DPAM 204 can be used to perform the functions in place of the NPCM 202. For example, the above functionality can be directly built on the DPAM 204 associated with the radio receiving system 208.

Then, the request data 302 may be converted to a format suitable for the internet 106 from a format suitable for the first communication network 304 using the NPCM 202. In one embodiment, the NPCM 202 may perform the protocol conversion by receiving the request data 302 from the input device accessing the first communication network 212, converting the request data 302 from a protocol of the first communication network 212 to an internet protocol suite (TCP/IP), and forwarding the request data 302 of the internet protocol suite to the IMDS 102. The request data 302 may be comprised of an identification tag for the internet multimedia data and/or one or more destination data for the internet multimedia data. The internet multimedia data stored in a storage device 308, which is coupled to the IMDS 102, is accessed based on the identification tag of the request data 302. The destination data for the internet multimedia data may be a cellular identifier (e.g., a cellular number) associated with the radio receiving system 208. In addition, the request data 302 can be stored and/or forwarded from the NPCM 202 to the IMDS 102 at a scheduled time. Alternatively, the request data 302 can be forwarded as soon as it is received by one of the input devices.

Once the internet multimedia data is accessed from the storage device 308, it may be converted to a format suitable for the cellular network 206 from the internet protocol suite using the NPCM 202. The NPCM 202 receives reply data 310 of the internet protocol suite from the IMDS 102 and converts the reply data 310 of the internet protocol suite to a protocol of the cellular network 206 (e.g., GSM/GPRS/UMTS). The NPCM 202 then forwards the reply data 310 of the protocol of the cellular network 206, where the reply data 310 of the protocol of the cellular network 206 is further converted and forwarded for processing in the radio receiving system 208 of FIG. 2. The reply data 310 may be forwarded at a scheduled time. Alternatively, the reply data 310 can be forwarded as soon as it is received by the NPCM 202.

It is appreciated that the NPCM 202 is able to identify the DPAM 204 based on a unique address (e.g. IP V.4 or V.6 address format) and/or then beam the internet multimedia data in a very short amount of time to a specific DPAM and/or store the requested information to the device memory. It is also appreciated that the IMDS 102, the NPCM 202, and/or the DPAM 204 can keep track and/or bundle certain multimedia information that a user wants to listen based on the user's preferences (e.g., of time). In addition, the NPCM 202 can keep track of the users' preference for certain types of multimedia information. Based on that information, the user can subscribe to the user's choice of multimedia information. For example, the user can sign up to receive "breaking news" in a particular area of interest. If there is a group of users who happen to subscribe to the news, then the NPCM 202 may multicast that piece of information to the group of users.

Figure 4:
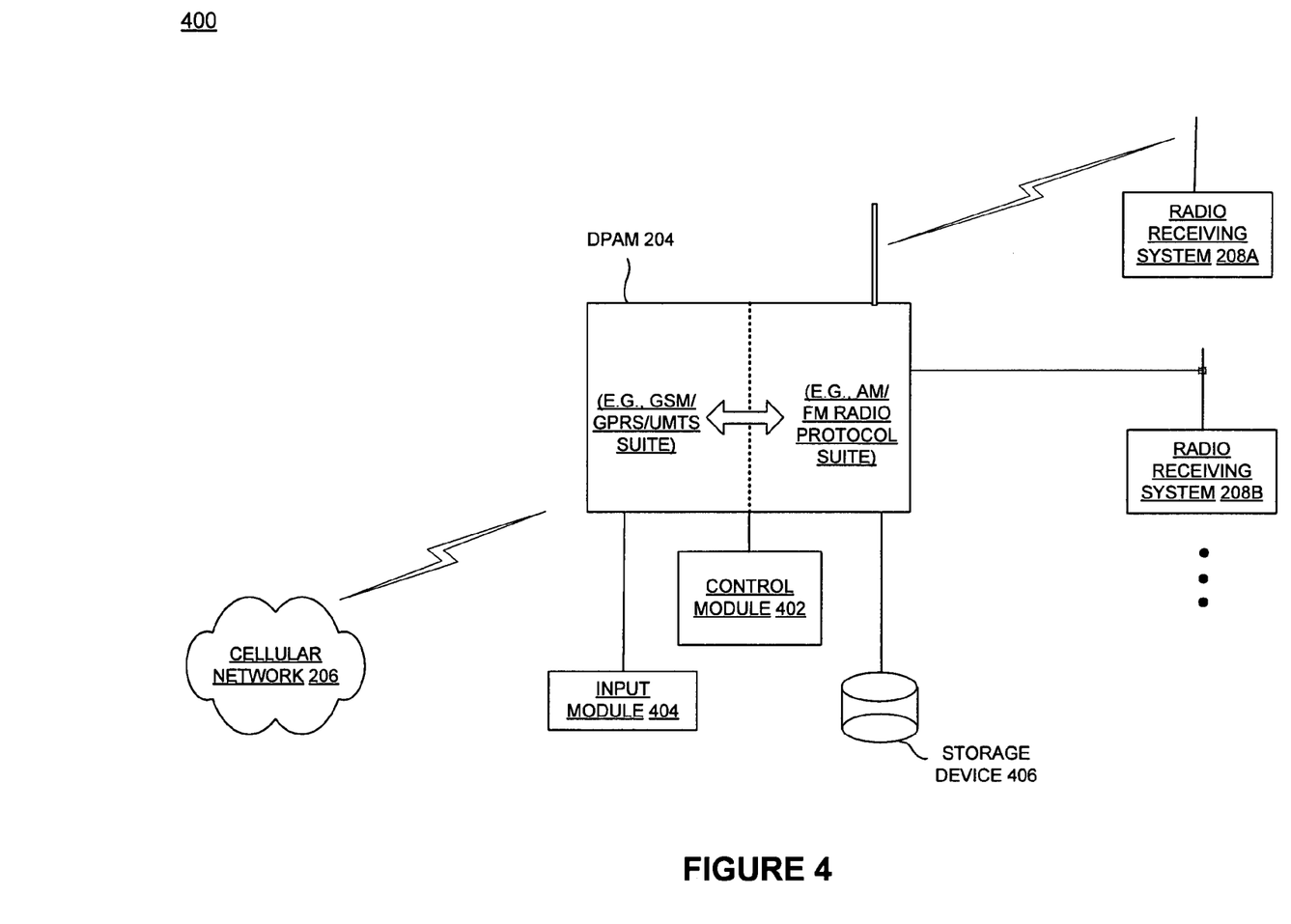
FIG. 4 is a block diagram illustrating exemplary functions of the DPAM of FIG. 2, according to one embodiment.

FIG. 4 is a block diagram illustrating exemplary functions of the DPAM 204 of FIG. 2, according to one embodiment. The DPAM 204 may convert the internet multimedia data of the format suitable for the cellular network 206 to a format suitable for the radio receiving system (208A, 208B, etc.). During the conversion process, the DPAM 204 receives the internet multimedia data via the cellular network 206, and converts the internet multimedia data to a data type associated with the radio receiving system (206A, 206B, etc.). In one exemplary implementation, the internet multimedia data may be converted by extracting the audio data from the internet multimedia data and by amplitude or frequency modulating the audio data. Subsequently, the DPAM 204 forwards the internet multimedia data of the data type to the radio receiving system (208A, 208B, etc.) through a radio channel, where the internet multimedia data via the cellular network 206 is serviced by the IMDS 102 of FIG. 1.

The internet multimedia data through the cellular network 206 may include audio data generated by a radio station coupled to the ISDM 102. In addition, the internet multimedia data via the cellular network 206 may be audio data in a global system for mobile communications (GSM) format, a general packet radio service (GPRS) format, or a universal mobile telecommunications system (UMTS) format. The radio receiving system (206A, 206B, etc.) may be an AM radio and/or a FM radio.

Furthermore, the DPAM 204 may further include a storage module 406 which stores the internet multimedia data via the cellular network 206. In addition, the DPAM 204 may include a control module 402 which assesses a quality of the internet multimedia data via the cellular network 206 and/or processes error messages. Additionally, the DPAM 204 includes an input module 404 which is used to request the internet multimedia data. It is appreciated that the DPAM 204 is not limited to converting the internet multimedia data to a format suitable for the radio receiving system (208A, 208B, etc.). The DPAM 204 can be used to convert the internet multimedia data of the cellular network 206 to a format playable in any type of consumer audio device (e.g., an IPOD, a Walkie Talkie, etc.). Additionally, the DPAM 204 can be used to deliver request data forwarded by the input module 404 to the IMDS 102 of FIG. 1. Furthermore, the DPAM 204 can be used to deliver data forwarded by the input module 404 to other DPAMs.

Figure 5:
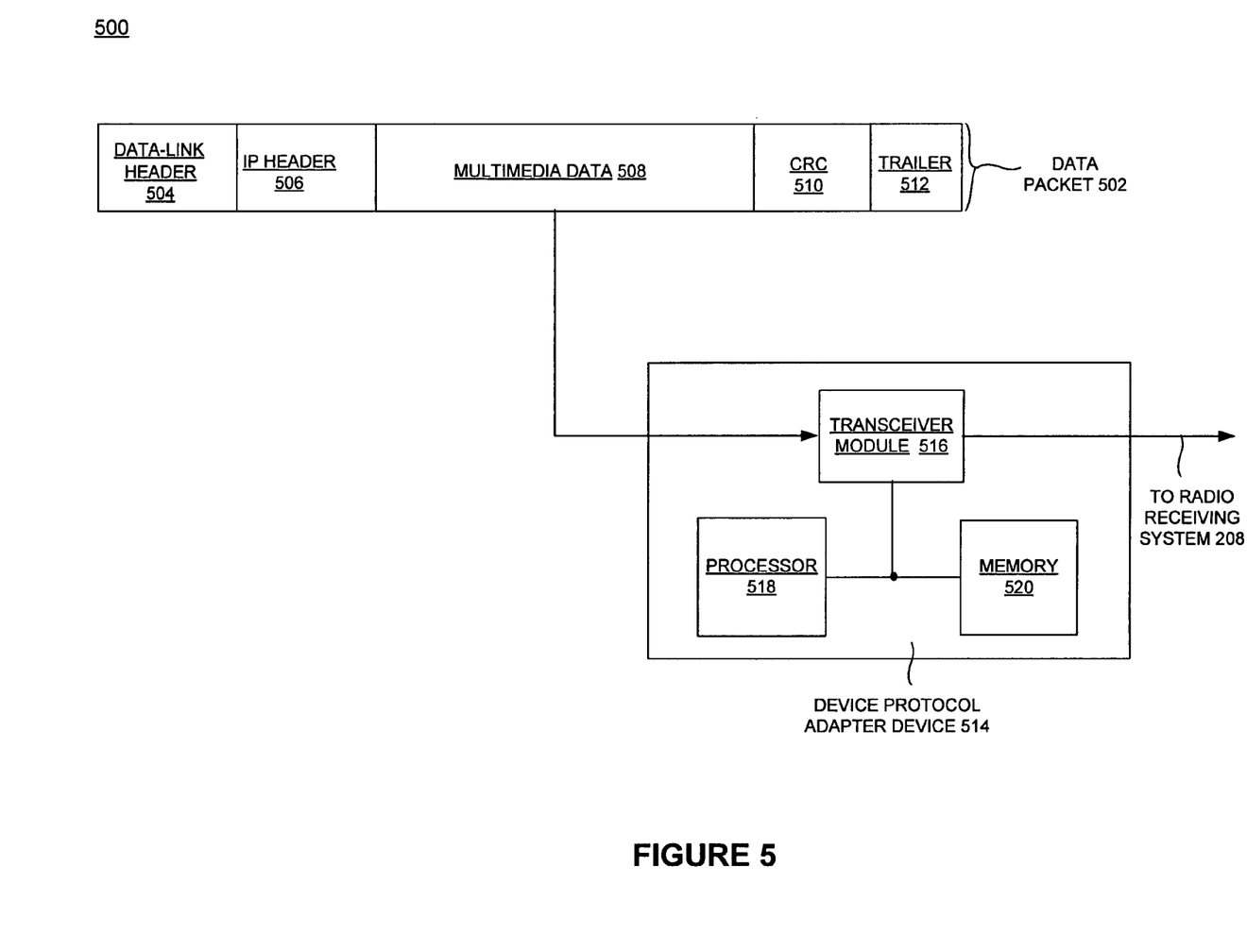
FIG. 5 is a block diagram illustrating an exemplary device protocol adapter device associated with the DPAM of FIG. 2, according to one embodiment.

FIG. 5 is a block diagram illustrating an exemplary device protocol adapter device 514 associated with the DPAM 204 of FIG. 2, according to one embodiment. The device protocol adapter device 514 may be a device for communicating internet multimedia data to the radio receiving system 208 via the cellular network 206. The device protocol adapter device 514 may include a transceiver module 516, a processor 518, a memory 520, and/or other components. In one embodiment, the memory 520 may comprise a set of instructions, when executed by the processor 518 and the transceiver module 516, executes a method of receiving the internet multimedia data via the cellular network 206, converting the internet multimedia data to a data type associated with the radio receiving system 208, and forwarding the internet multimedia data of the data type to the radio receiving system 208, where the internet multimedia data via the cellular network 206 is serviced by the IMDS 102 of FIG. 1. The internet multimedia data may be communicated in data packets. Each data packet 502 may includes a data-link header 504, an IP header 506, a multimedia data 508, a CRC 510, and a trailer 512.

In one exemplary implementation, the device protocol adapter device 514 may be implemented at a close proximity to the radio receiving system 208 (e.g., AM/FM radio) in a wireless and/or wired fashion. When the wired connection is used between the device protocol adapter device 514 and the radio receiving system 208, there is negligible amount of electromagnetic radiation being emitted by the wire that can disrupt a radio frequency in the air, where the disruption can be reduced by using a wire with a low inductance. Thus, multiple radio receiving systems 208 can be coupled to the device protocol adapter device 514 using multiple wires.

In another exemplary implementation, the device protocol adapter device 514 may be realized in a miniaturized module (e.g., a semiconductor chip) which can be mounted on a circuit board of the radio receiving system 208, which makes it convenient for a car radio system.

Figure 6:
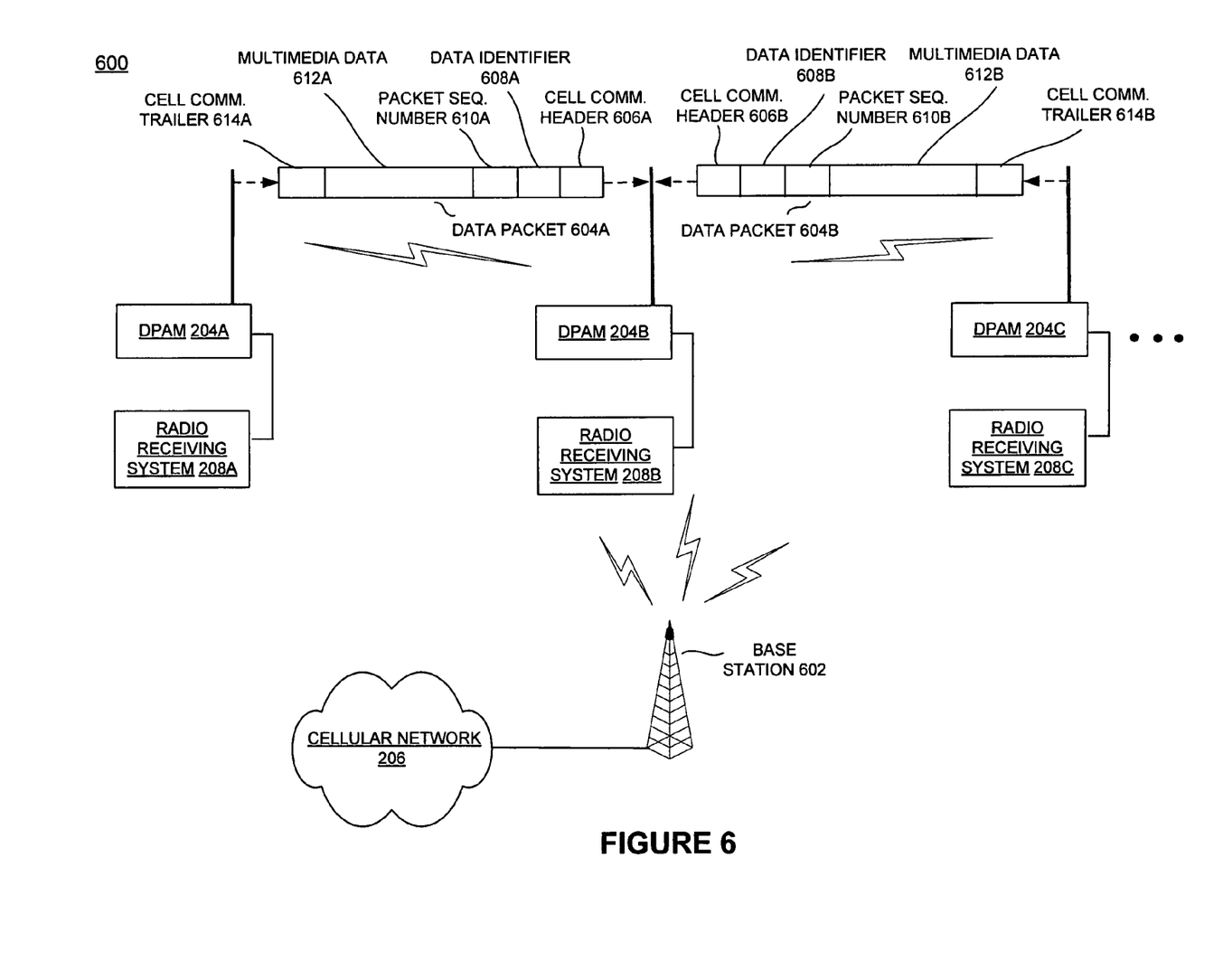
FIG. 6 is a block diagram illustrating workings of multiple DPAMs of FIG. 2, according to one embodiment.

FIG. 6 is a block diagram illustrating workings of multiple DPAMs of FIG. 2, according to one embodiment. In FIG. 6, a base station 602 is used to transmit internet multimedia data via the cellular network 206. The DPAM (204A; 204B; 204C) can be a broadcast radio source to send audio information through the air over conventional radio frequencies. Depending on the signal strengths, multiple radio receiving systems (208A; 208B; 208C) can receive the audio information.

In addition, any of the DPAM (204A; 204B; 204C) can receive the internet multimedia data via the cellular network 206 and broadcast the data to another DPAM. For example, if a channel between the base station 602 and the DPMA 204B is down, the DPAM 204A or the DPAM 204C may be used to broadcast the internet multimedia data to the DPAM 204B, provided that the channel between the base station 602 and the DPAM 204A or the DPAM 204C is up.

In one exemplary implementation, the transceiver module 516 of the device protocol adapter device 514 of the DPAM 204A or the DPAM 204C may be used to broadcast the internet multimedia data via the cellular network 206 to the DPAM 204B when the channel between the DPAM 204B and the base station 602 is dropped. In other words, the transceiver module 516 of the DPAM 204B is operable to receive the internet multimedia data from the DPAM 204A or the DPAM 204C when the DPAM 204B fails to receive the internet multimedia data from the base station 602.

Furthermore, the DPAM 204B can broadcast a request for a specific piece of the internet multimedia data it is missing, once it fails to establish a connection with the base station 602. The DPAM 204A or the DPAM 204C may listen to this request, check its own database to see if it has the requested piece of data, and/or transmit it to the DPAM 204B. If the DPAM 204A or the DPAM 204C, which may be implemented in an automobile, moves out of the range, the DPAM 204B may restart the request until it receives its missing data from another available signal source.

The internet multimedia data being broadcasted from the DPAM 204A or the DPAM 204C to the DPAM 204B may be communicated in packets. In one embodiment, each of the packets (604A; 604B) may include a cellular communication header (606A; 606B), a data identifier (608A; 608B), a packet sequence number (610A; 610B), multimedia data (612A; 612B), and a cellular communication trailer (614A; 614B). The packet sequence number (610A; 610B) and/or the data identifier (608A; 608B) may be used to identify the packets of the internet multimedia data, thus enabling the DPAM (204A; 204B; 204C) to process the internet multimedia data in discrete blocks. It is appreciated that the DPAMs can transmit and/or receive information stored in a proximate storage device without relying on the information forwarded by the base station 602. It is also appreciated that the DPAMs are stand alone devices which can be used to enter, transmit and/or receive data while retaining the features described above.

Given that the DPAMs are equipped with a GPS receiver, the NPCM 202 can receive the spatial coordinates (e.g., GPS coordinates) from the DPAMs. Then, it can command one of the DPAMs to transmit a complete or partial set of information (e.g., data packets) to other DPAMs which are in the proximity. Similarly, each of the DPAMs can inquire the NPCM 202 about other DPAMs in the proximity for the complete or partial set of information, and/or one or more of the DPAMs which can reach the inquiring DPAM with the requested information can deliver the information. The NPCM 202 can also provide the network addresses of the DPAMs where the information can be fetched. Also, a particular DPAM (204B) can process spatial coordinates transmitted from other DPAMs and locate a nearby DPAM (204A; 204C). Then, it can directly communicate with the proximate DPAM. In one exemplary implementation, the DPAM 204B can let its presence known to the other DPAMs (204A; 204C) by broadcasting its own spatial coordinate and then get responses from the other DPAMs which are in the areas. Then, based on the responses, the DPAM 204B can initiate communication with one of more of the DPAMs which have spatial coordinates that closely match with its own spatial coordinate.

Figure 7:
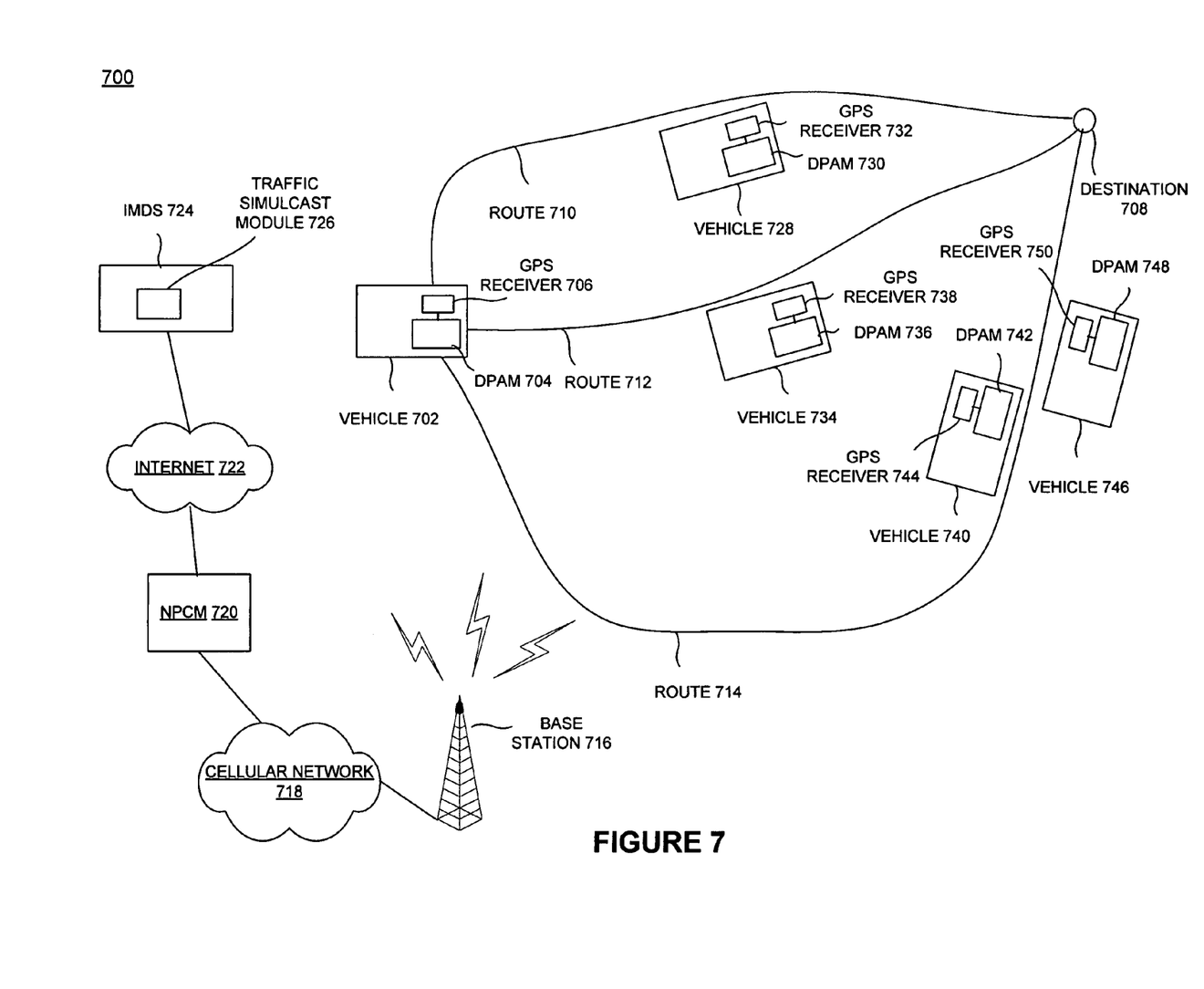
FIG. 7 is a block diagram illustrating an exemplary network system based on multiple DPAMs of FIG. 1 for simulcasting traffic conditions, according to one embodiment.

FIG. 7 is a block diagram illustrating an exemplary network system based on multiple DPAMs of FIG. 1 for simulcasting traffic condition, according to one embodiment. In FIG. 7, a vehicle 702 is equipped with a DPAM 704 coupled to a GPS receiver 706. It is appreciated that the DPAM 704 is an exemplary embodiment of the DPAM 108 of FIG. 1. It is also appreciated that the GPS receiver 706 continuously calculates its position using signals from multiple GPS satellites. When a driver of the vehicle 702 wants to find out conditions of the routes leading to a destination 708, the driver can send a request data to a traffic simulcast module 726 of an IMDS 724 via a base station 716, a cellular network 718, an NPCM 720, and the internet 722. It is appreciated that the base station 716, the cellular network 718, the NPCM 720, the internet 722, and the IMDS 724 operate similar to their counterparts in FIG. 1.

The traffic simulcast module 726 calculates and/or evaluates traffic conditions of a variety of routes using GPS data transmitted by vehicles equipped with a DPAM and a GPS receiver. In FIG. 7, the traffic simulcast module 726 calculates and/or evaluates traffic conditions of a route 710, a route 712, and a route 714 based on GPS data forwarded by vehicle 728, vehicle 734, and vehicle 740 (e.g., or vehicle 746), respectively. It is appreciated that the GPS receiver in each vehicle can send its present location in real time to the traffic simulcast module 726. Thus, by calculating the speed of one or more vehicles travelling on each route, the traffic condition can be evaluated.

In one exemplary implementation, the traffic simulcast module 726 can evaluate and recommend the fastest route to the vehicle 702 by weighing the route distance and the flow of traffic in each route and/or forwarding the traffic information to the IMDS which requested for it. Upon receiving the traffic information, a display unit of the GPS coupled to the IMDS can be used to display the traffic information. It is appreciated that the embodiment described above utilizes the existing infrastructure, and can be implemented to any locality as long as there are a minimum number of vehicles equipped with the DPAM and/or GPS receiver.

In another exemplary implementation, the NPCM 720 can keep track of all the spatial coordinates along the roads where a user is not supposed to stop, and/or determine normalcy of the user's driving through periodic checking of GPS coordinates transmitted by the DPAM 704 in the user's vehicle. For example, a major freeway may be designated as such an area. If the spatial coordinates as transmitted by a GPS enabled DPAM (e.g., 704) and updated by the NPCM 720 for that particular DPAM don't change within a threshold time, then this may indicate that the user's vehicle is stopped (e.g., or stalled and/or need help). Also, DPAMs can self monitor changes to their spatial coordinates along some critical driving paths and/or can forward the traffic condition to other DPAMs and/or wireless communication devices in the vicinity using cellular network 718 or other wireless network.

Figure 8:
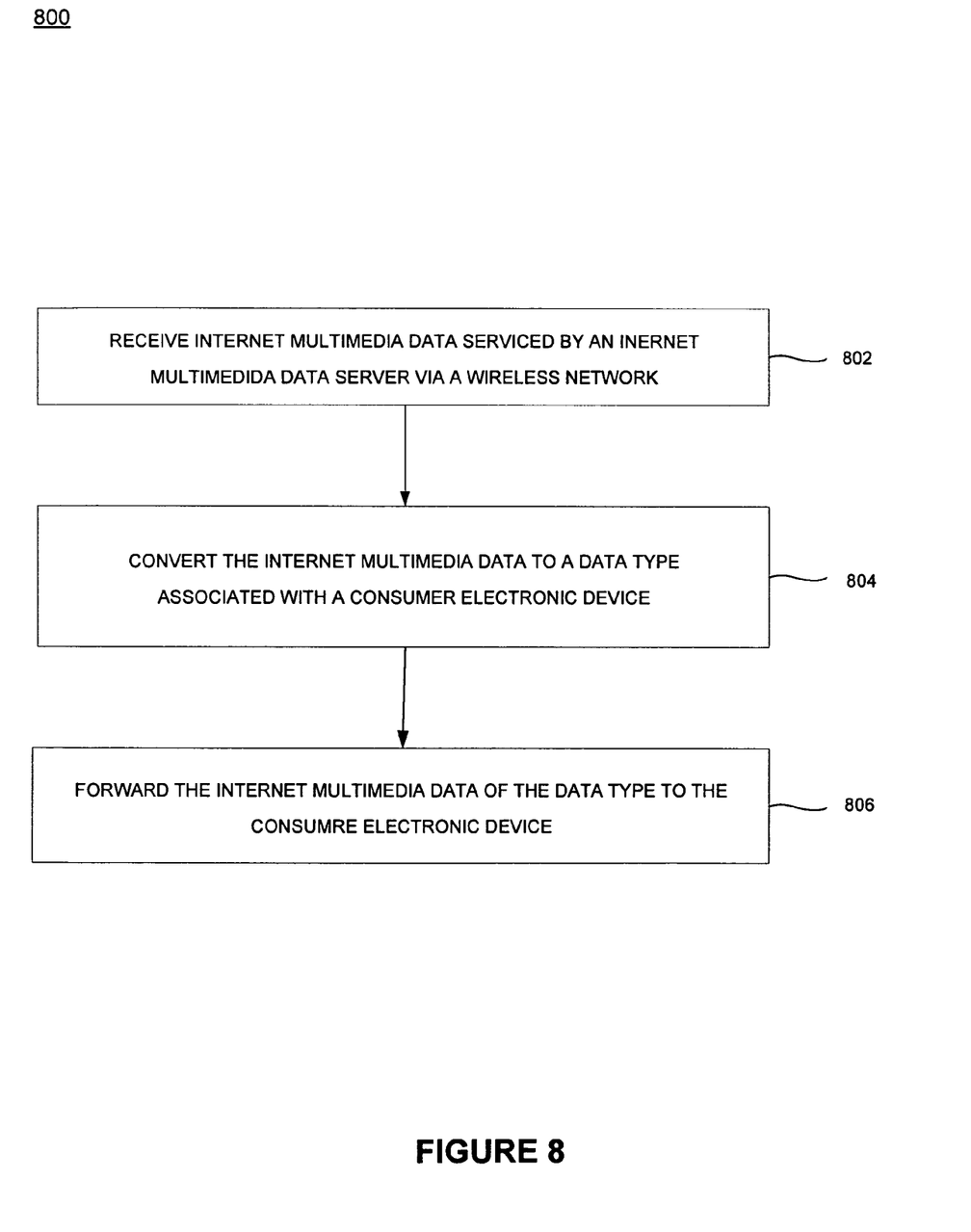
FIG. 8 is process flow chart of an exemplary method for delivering internet multimedia data to a consumer electronic device via a wireless communication network, according to one embodiment.

FIG. 8 is a process flow chart of an exemplary method 800 for delivering internet multimedia data to a consumer electronic device via a wireless communication network, according to one embodiment. In operation 802, the internet multimedia data via the wireless network, which is serviced by an internet multimedia data server, is received. In operation 804, the internet multimedia data is converted to a data type associated with the consumer electronic device. In operation 806, the internet multimedia data of the data type is forwarded to the consumer electronic device.

Figure 9:
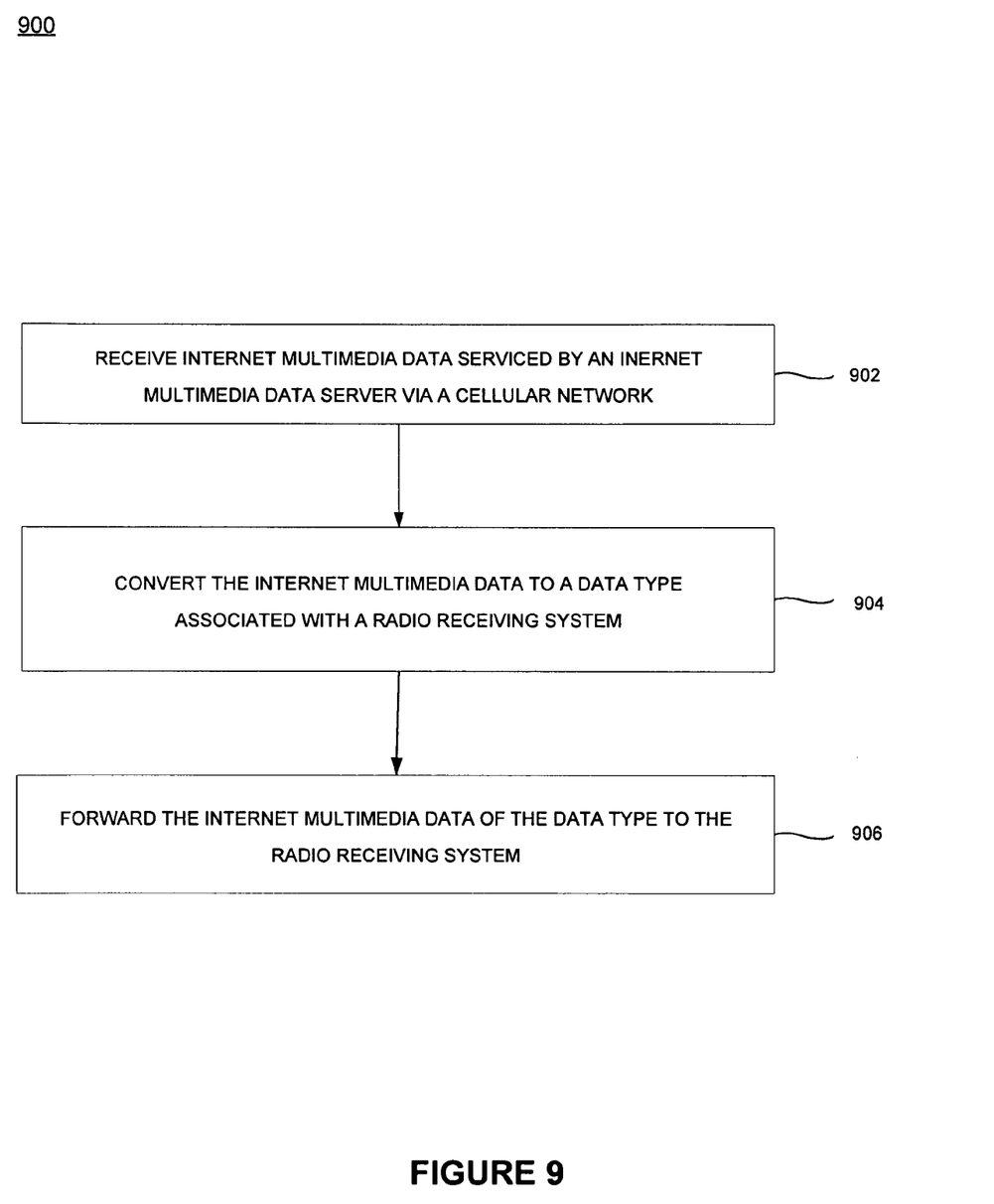
FIG. 9 is a process flow chart of an exemplary method for delivering internet multimedia data to a radio receiving system via a cellular network, according to one embodiment.

FIG. 9 is a process flow chart of an exemplary method 800 for delivering internet multimedia data to a radio receiving system via a cellular network, according to one embodiment. In operation 902, the internet multimedia data serviced by an internet multimedia data server is received via the cellular network. In operation 904, the internet multimedia data is converted to a data type associated with the radio receiving system. In operation 906, the internet multimedia data of the data type is forwarded to the radio receiving system.

Figure 10:
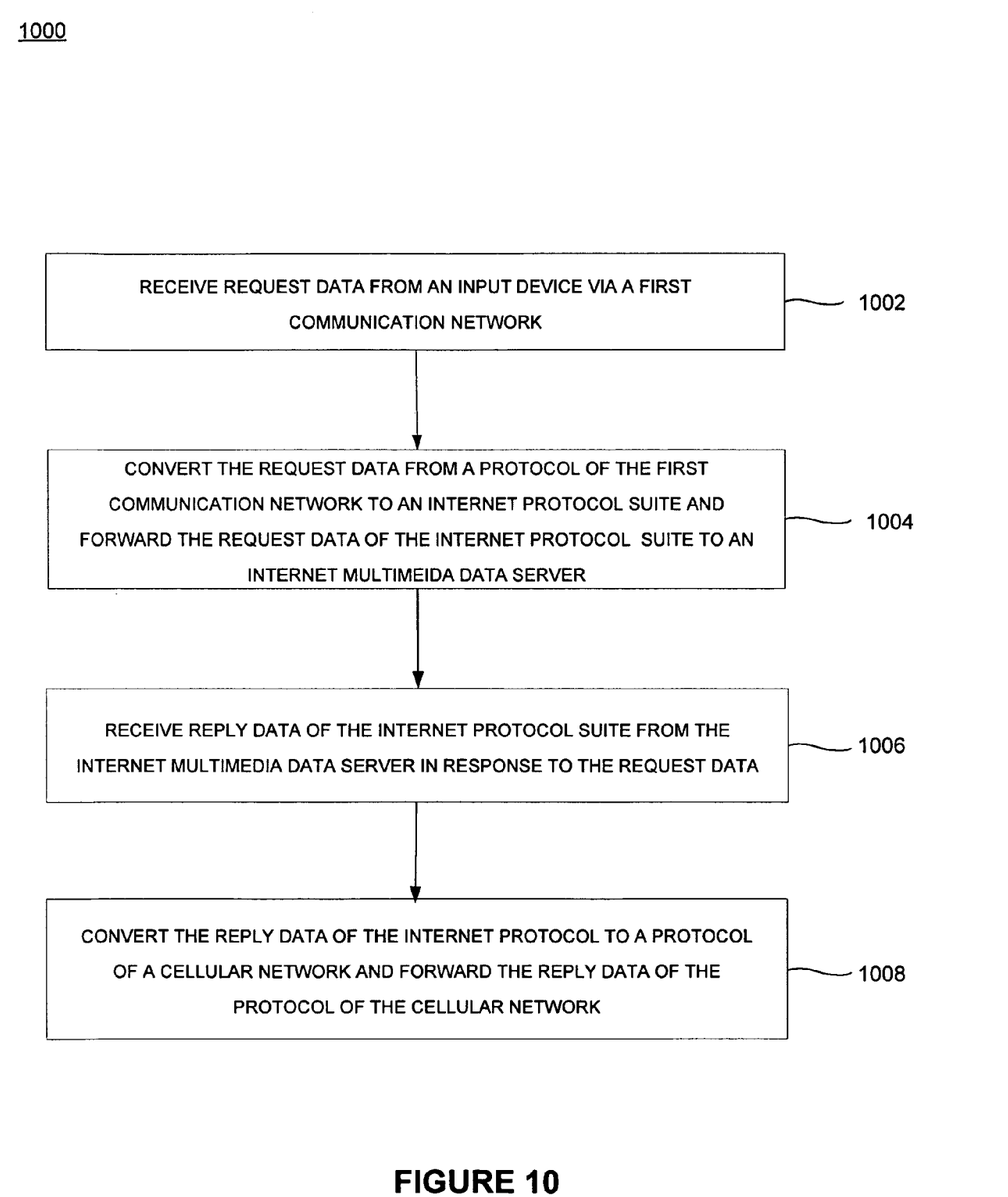
FIG. 10 is a process flow chart of an exemplary method for interfacing multiple communication networks, according to one embodiment.

FIG. 10 is a process flow chart of an exemplary method 1000 for interfacing multiple communication networks, according to one embodiment. In operation 1002, request data from an input device is received via a first communication network. In operation 1004, the request data is converted from a protocol of the first communication network to an internet protocol suite, and the request data of the internet protocol suite is forwarded to an internet multimedia data server. In operation 1006, reply data of the internet protocol is received from the internet multimedia data server in response to the request data. In operation 908, the reply data of the internet protocol is converted to a protocol of a cellular network, and the reply data of the protocol of the cellular network is forwarded. In addition, the reply data of the protocol of the cellular network may be further converted and forwarded for processing in a radio receiving system.

It is appreciated that the systems, methods, and devices described in the detailed descriptions are not limited to processing internet multimedia data in one or more radio receiving systems. The NPCM 104 in combination with the DPAM 108 may enable to seamlessly process the internet multimedia data in any types of consumer electronic devices, such as video players as well as other types of audio players.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be according the widest scope consistent with the principles and novel features disclosed herein.

What is claimed is:

1. A method for communicating internet multimedia data to a consumer electronic device via a wireless network, comprising:

receiving the internet multimedia data via the wireless network;

converting the internet multimedia data to a format and a data type suitable for the consumer electronic device; and forwarding the converted internet multimedia data to the consumer electronic device, wherein the internet multimedia data via the wireless network is serviced by an internet multimedia data server, wherein the internet multimedia data received is in response to a request for the internet multimedia data by an input device connected to the wireless network, wherein the request includes an identification tag and one or more destination data for the internet multimedia data, wherein the input device does not receive internet multimedia data or converted internet multimedia data, wherein the request from the input device is received and serviced by the multimedia data server, and wherein the internet multimedia data is stored in a storage coupled to the multimedia data server and is accessed using the identification tag.

2. The method of claim 1, wherein the internet multimedia data via the wireless network is in a data format for the wireless network which is converted from a format of the internet multimedia data when stored in the internet multimedia data server.

3. The method of claim 1, wherein the consumer electronic device comprises a GPS receiver.

4. The method of claim 3, wherein the internet multimedia data server comprises a traffic simulcast module for receiving GPS data from the GPS receiver and forwarding traffic information associated with the GPS data.

5. The method of claim 4, wherein the GPS receiver comprises a display unit for displaying the traffic information.

6. A method for communicating internet multimedia data to a radio receiving system via a cellular network, comprising:
   receiving the internet multimedia data via the cellular network;
   converting the internet multimedia data to a format and a data type suitable for the radio receiving system; and
   forwarding the converted internet multimedia data to the radio receiving system, wherein the internet multimedia data via the cellular network is serviced by an internet multimedia data server, wherein the internet multimedia data received is in response to a request for the internet multimedia data by an input device connected to the wireless network, wherein the request includes an identification tag and one or more destination data for the internet multimedia data, wherein the input device does not receive internet multimedia data or converted internet multimedia data, wherein the request from the input device is received and serviced by the multimedia data server, and wherein the internet multimedia data is stored in a storage coupled to the multimedia data server and is accessed using the identification tag.

7. The method of claim 6, wherein the internet multimedia data via the cellular network comprises audio data generated by a radio station coupled to the internet multimedia data server.

8. The method of claim 6, wherein the radio receiving system comprises an AM radio and a FM radio.

9. The method of claim 6, wherein the internet multimedia data via the cellular network comprises audio data in a global system for mobile communications (GSM) format, a general packet radio service (GPRS) format, or a universal mobile telecommunications system (UMTS) format.

10. The method of claim 9, wherein the converting the internet multimedia data comprises:
    extracting the audio data from the internet multimedia data; and
    modulating the audio data.

11. The method of claim 10, wherein the internet multimedia data of the data type comprises amplitude modulated (AM) data of the audio data and frequency modulated (FM) data of the audio data.

12. The method of claim 11, wherein the forwarding the internet multimedia data of the data type comprises transmitting the AM data or the FM data to the radio receiving system through a radio channel.

13. A device for communicating internet multimedia data to a radio receiving system via a cellular network, comprising:
    a transceiver module;
    a processor;
    a memory comprising a set of instructions, when executed by the processor and the transceiver module, executes a method comprising:
        receiving the internet multimedia data via the cellular network;
        converting the internet multimedia data to a format and a data type suitable for the radio receiving system; and
        forwarding the converted internet multimedia data to the radio receiving system, wherein the internet multimedia data via the cellular network is serviced by an internet multimedia data server, wherein the internet multimedia data received is in response to a request for the internet multimedia data by an input device connected to the wireless network, wherein the request includes an identification tag and one or more destination data for the internet multimedia data, wherein the input device does not receive internet multimedia data or converted internet multimedia data, wherein the request from the input device is received and serviced by the multimedia data server, and wherein the internet multimedia data is stored in a storage coupled to the multimedia data server and is accessed using the identification tag.

14. The device of claim 13, wherein the transceiver module is operable to broadcast the internet multimedia data via the cellular network to another device for communicating the internet multimedia data to its respective radio receiving system via its respective channel of the cellular network when a respective channel of the another device is dropped.

15. The device of claim 13, wherein the transceiver module is operable to receive the internet multimedia data from another device for broadcasting the internet multimedia data via the wireless network if the receiving of the internet multimedia data by the device fails.

16. The device of claim 13, further comprising a storage module for storing the internet multimedia data via the cellular network.

17. The device of claim 13, further comprising a control module for assessing a quality of the internet multimedia data via the cellular network.

18. The device of claim 13, further comprising an input module for requesting the internet multimedia data.

19. A method for interfacing multiple communication networks, comprising:
    receiving request data from an input device via a first communication network;
    converting the request data from a protocol of the first communication network to an internet protocol suite and forwarding the request data of the internet protocol suite to an internet multimedia data server; and
    receiving reply data of the internet protocol suite from the internet multimedia data server in response to the request data; and
    converting the reply data of the internet protocol suite to a protocol of a cellular network and forwarding the converted reply data, wherein an audio data embedded in the reply data is extracted, wherein the converted reply data is further converted and forwarded for processing in a radio receiving system, and wherein the input device comprises one of a public switch telephone network (PSTN) input device, a cellular input device, and an internet protocol (IP) input device, wherein the input device does not receive reply data or converted reply data, and wherein the converted request data from the input device is received by the internet multimedia data server, wherein the request includes an identification tag and one or more destination data for the internet multimedia, wherein the internet multimedia data is stored in a storage coupled to the multimedia data server and is accessed using the identification tag, and wherein the radio receiving system does not request the data.

20. The method of claim 19, wherein the first communication network comprises a public switched telephone network (PSTN), a cellular network, a satellite network, and an internet protocol (IP) network.

21. The method of claim 19, wherein the request data comprises an identification tag for internet multimedia data.

22. The method of claim 21, wherein the internet multimedia data is accessed by the internet multimedia data server based on the identification tag of the request data.

23. The method of claim 19, wherein the request data comprises at least one destination data for the internet multimedia data.

24. The method of claim 23, wherein the at least one destination data for the internet multimedia data comprises a cellular identifier associated with the radio receiving system.

25. The method of claim 19, wherein the forwarding the request data is performed at a scheduled time.

26. The method of claim 19, wherein the forwarding the reply data is performed at a scheduled time.

27. The method of claim 1, wherein the request can be stored or forwarded to the internet multimedia server at a scheduled time.

28. The method of claim 1, wherein the internet multimedia data is communicated in a data packet wherein the data packet includes a data-link header, an IP header, a multimedia data, a CRC, and a trailer.

29. The method of claim 6, wherein the request can be stored or forwarded to the internet multimedia server at a scheduled time.

30. The method of claim 6, wherein the internet multimedia data is communicated in a data packet wherein the data packet includes a data-link header, an IP header, a multimedia data, a CRC, and a trailer.

* * * * *